United States Patent
Ma et al.

(10) Patent No.: US 12,026,535 B2
(45) Date of Patent: Jul. 2, 2024

(54) SYSTEM AND COMPUTER-IMPLEMENTED METHOD FOR CONTROLLING A ROBOT OF A VIRTUAL MACHINE

(71) Applicant: UiPath, Inc., New York, NY (US)

(72) Inventors: Tao Ma, Bellevue, WA (US); Clement Fauchere, Spring Branch, TX (US)

(73) Assignee: UiPath, Inc., New York, NY (US)

( * ) Notice: Subject to any disclaimer, the term of this patent is extended or adjusted under 35 U.S.C. 154(b) by 398 days.

(21) Appl. No.: 17/485,934

(22) Filed: Sep. 27, 2021

(65) Prior Publication Data

US 2023/0102169 A1    Mar. 30, 2023

(51) Int. Cl.
| | |
|---|---|
| G06F 9/455 | (2018.01) |
| G06F 8/61 | (2018.01) |
| G06F 8/65 | (2018.01) |
| G06F 9/54 | (2006.01) |
| G06F 21/44 | (2013.01) |

(52) U.S. Cl.
CPC ............ *G06F 9/45533* (2013.01); *G06F 8/61* (2013.01); *G06F 8/65* (2013.01); *G06F 9/542* (2013.01); *G06F 21/44* (2013.01)

(58) Field of Classification Search
None
See application file for complete search history.

(56) References Cited

U.S. PATENT DOCUMENTS

| | | | |
|---|---|---|---|
| 10,530,837 B2 | 1/2020 | Bala et al. | |
| 10,944,764 B2 | 3/2021 | Mixer | |
| 11,188,376 B1 * | 11/2021 | Alexander | G06F 9/45545 |
| 2012/0167090 A1 | 6/2012 | Hui et al. | |
| 2018/0304461 A1 | 10/2018 | Shaw | |
| 2020/0089860 A1 | 3/2020 | Buddhiraju et al. | |
| 2020/0348960 A1 | 11/2020 | Krishnamurthy et al. | |
| 2021/0034479 A1 | 2/2021 | Fukuta et al. | |

(Continued)

FOREIGN PATENT DOCUMENTS

| | | |
|---|---|---|
| CN | 106775942 A | 5/2017 |
| WO | 2015116850 A1 | 8/2015 |
| WO | 2019011421 A1 | 1/2019 |

OTHER PUBLICATIONS

International Search Report & Written Opinion, issued Jun. 22, 2022, PCT Application No. PCT/US21/57171.

(Continued)

*Primary Examiner* — Craig C Dorais
(74) *Attorney, Agent, or Firm* — LeonardPatel PC; Sheetal S. Patel; Michael A. Leonard II

(57) ABSTRACT

Controlling and provisioning a robot of a virtual machine (VM) includes transmitting a connection request between a first service installed in a virtual machine and a second service. The robot is associated with at least one process running on the virtual machine. The virtual machine is authenticated based on a token associated with the second service and the virtual machine. A connection is established between the first service and the second service. A command is transmitted associated with the controlling of the robot from the second service to the first service based on the authentication of the virtual machine. The command is associated with a corresponding command identifier for identifying a type of the command. The command is then executed for controlling the robot.

20 Claims, 10 Drawing Sheets

(56) References Cited

U.S. PATENT DOCUMENTS

2022/0334885 A1* 10/2022 Ren .................. G06F 21/10
2023/0275749 A1* 8/2023 Shin .................. G06F 21/44
713/156

OTHER PUBLICATIONS

Agents, Appian, retrieved from the internet Jul. 14, 2021, https://docs.appian.com/suite/help/21.2/rpa-7.6/setup/agents.html.

* cited by examiner

SYSTEM AND COMPUTER-IMPLEMENTED METHOD FOR CONTROLLING A ROBOT OF A VIRTUAL MACHINE

FIELD

The present invention generally relates to robotic process automation (RPA), and more specifically, to system and computer-implemented method for controlling a robot such as an RPA robot associated with a virtual-machine.

BACKGROUND

RPA has been used to facilitate the proliferation of software automation due to its execution of relatively simple, repeatable tasks that exist in large numbers within an enterprise. Generally, RPA applications are used to automate repetitive and manually intensive activities of a computing system. The manually intensive activities are now being increasingly performed by RPA robots using RPA tools. In some cases, different virtual machines (VMs) are created for the RPA robots. The different VMs are hosted by a service that can be a cloud provider or a local service like VMWare'. Currently, the service relies on scripts to control the RPA robots. The scripts are executed using extension functionality of a cloud service provider for controlling the robots. The extension functionality provides a conduit for VM storage between two environments, such as Microsoft® Azure® and GOOGLE® CLOUD. However, running the scripts using the extension functionality consumes time. In some cases, the cloud service provider lacks such extension functionality to execute the scripts and also those extensions might require increased privileges for execution. The lack of the extension functionality limits control operations such as start or stop operation of the RPA robots deployed in the VMs.

Thus, there is a need for an enhanced solution for controlling an RPA robot of a VM.

SUMMARY

Certain embodiments of the present invention provide better and easy solutions to the problems and needs in the art that have not yet been fully identified, appreciated, or solved by current RPA technologies. For example, some embodiments of the present invention pertain to controlling the robot deployed in the VM using a service such as a software-based agent and state of the VM. In some embodiments, the agent is installed as a software program in the VM.

In an embodiment, a system for controlling a robot includes memory and at least one processor. The memory is configured to store one or more computer-executable instructions, and the at least one processor is configured to execute the one or more computer-executable instructions to transmit a connection request from a first service installed in a virtual machine to a second service controlling the virtual machine. The robot is associated with at least one process running on the virtual machine. The one or more computer-executable instructions authenticate the virtual machine based on a token associated with the second service and the virtual machine. The one or more computer-executable instructions transmit a command associated with the controlling of the robot from the second service to the first service. The command is transmitted based on the connection of the virtual machine. The command is associated with a corresponding command identifier for identifying a type of the command. The one or more instructions execute the command for controlling the robot.

In an embodiment, a computer-implemented method for controlling a robot includes transmitting a connection request from a first service installed in a virtual machine and a second service controlling the virtual machine. The robot is associated with at least one process running on the virtual machine. The method includes authenticating the virtual machine based on a token associated with the second service and the virtual machine. The method includes establishing a connection between the first service and the second service based on the authentication. The method includes transmitting a command associated with the controlling of the robot from the second service to the first service based on the authentication of the virtual machine. The command is associated with a corresponding command identifier for identifying a type of the command. The method includes executing the command for controlling the robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
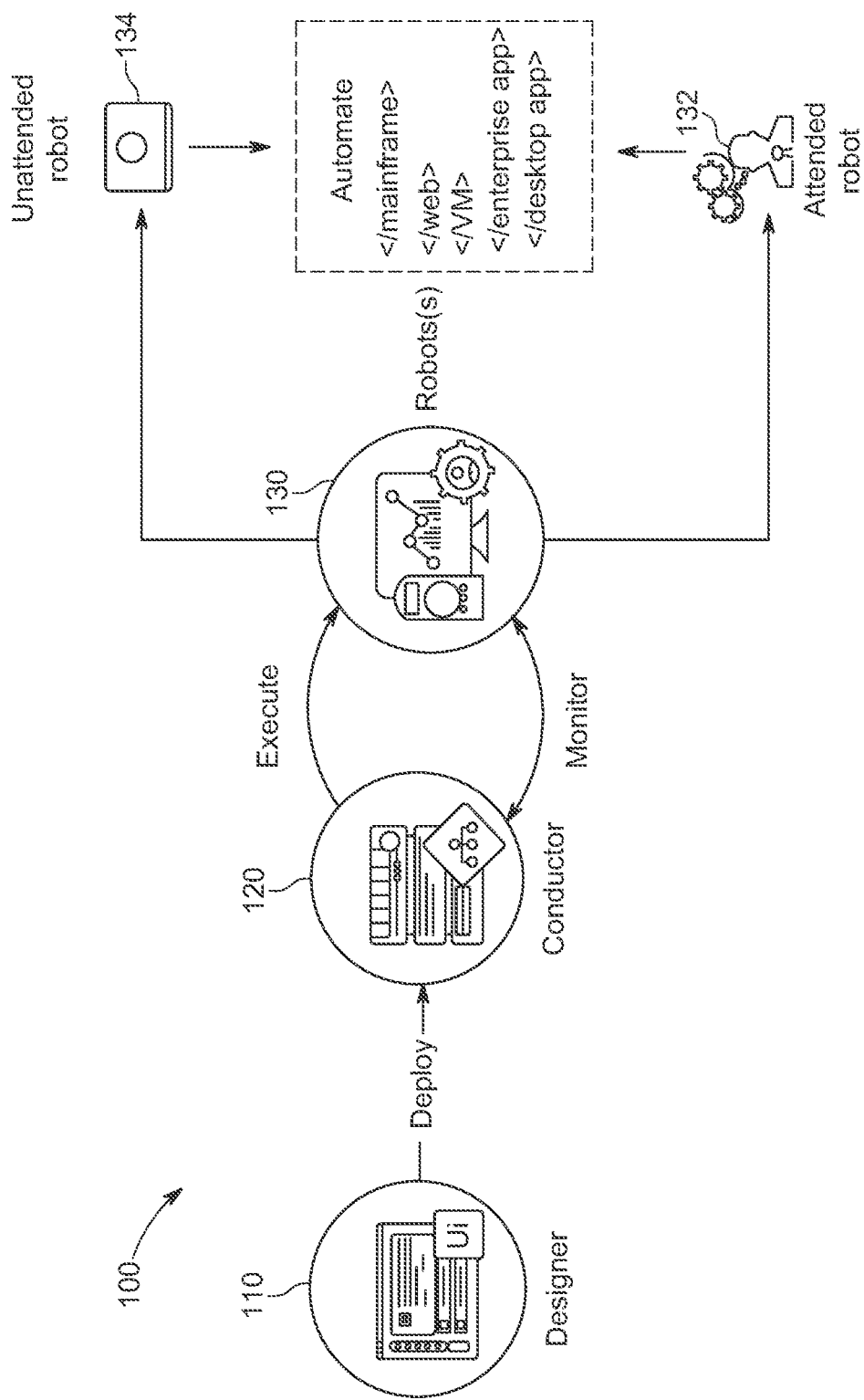
FIG. 1 is an architectural diagram illustrating an RPA system, according to an embodiment of the present invention.

Some embodiments pertain to a system (hereinafter referred to as a "computing system") configured to control a robot, such as an RPA robot, deployed in a VM. The RPA robot is collective representation of one or more RPA robots in the VM. In some example embodiments, a first service, such as a software program agent (referred to hereinafter as the 'agent'), is installed in the VM. The first service sends state information of the VM to a second service, which provisions controlling of the robot deployed in the VM. For example, the second service corresponds to a robot control service for controlling the robot. An example of the robot control service includes a second service, which sends control commands for the robot via the agent. In another embodiment, the second service includes a container service for the controlling the robot deployed in the VM. In particular, the container service creates or isolates a computing unit environment abstracted from an operating system and/or a kernel of the system. The container service may provide a container. In some embodiments, the container is an instance of a package or a software program for a service or set of services to be executed for provisioning the control of the robot.

In some embodiments, the agent is connected to the second service via a cloud-based service. The cloud-based service provides a real-time communication between the agent and the second service. The agent sends periodically, a real-time update, such as the status information of the VM, to the second service after every elapse of a pre-defined time-interval, e.g. 20 seconds. The status information may include an active status of the VM, a VM key of the VM, a host machine name of the VM, a set of authentication credential data of the VM, and a plurality of telemetry data such as security data, health data, quality, and performance analysis data of the VM. After receiving the status information of the VM, the second service is informed about the running status of the VM. In this manner, the second service avoids polling or sending a new request to a server for updating of the VM.

In some embodiments, an authentication of the VM is performed. The VM is authenticated based on a token associated with the second service. The token includes a robot license key corresponding to the robot of the virtual machine and a secret key. The token is generated in the second service. The generated token is stored in a database of the second service. Further, the generated token is transmitted to the VM. In the VM, the token is copied to a file under a directory that installs the agent. The file storing the token is protected with an access restriction such that only a designated user (e.g., an administrative user or admin, with write/delete access privileges) accesses the token from the file. Thus, access restriction is a mechanism for protecting the file containing the token, the mechanism being implementing by setting the properties of the file in such a manner, that the token is protected from being accessed by public users or any unidentified users or even the VM. The access restriction eliminates access to the file containing the token by users other than the administrative user. For instance, the access restriction for an authorized user may only allow the user to read the file containing the token, while write/delete is enabled for the administrative user. In some embodiments, the access restriction is managed by managing roles and permission settings in an RPA system. When the agent sends a connection request to connect with the second service via the cloud-based service, the token is added in a header of the connection request. The second service verifies the token using an authorization handler.

Further, the system generates a connection identifier for the second service upon establishing the connection between the second service and the agent. After the connection is established, the agent sends the status information of the VM to the second service. The second service sends a command for controlling the RPA robot to the agent via the cloud-based service upon receipt of the status information. The command corresponds to at least an install command to install the robot in the VM, a connect command to connect the robot to an orchestrator, a disconnect command to disconnect the robot from the orchestrator, or the like. In some embodiments, the second service calls a function to generate a command identifier corresponding to the command for controlling the robot. Thus, the second service sends the command along with the command identifier and the connection identifier to the agent.

Furthermore, the agent sends a notification and a report, such as a status report, to the second service upon completion of the command execution. The status report includes state of the command, such as complete state, incomplete state, and/or execution state of the command. In some embodiments, the state of the command is saved in a database that is polled periodically for completion of the command execution. Upon completion of the command execution, a command completion state is returned. In some cases, if the command is not completed within a predefined time-period, a timeout error is returned. In some alternate embodiments, an incomplete state of the command executed is returned. The agent may disconnect from the second service due to timeout error. The agent may reconnect to the second service by sending a connection request via the cloud-based service.

In some embodiments, the agent is updated based on an update command. The second service sends the update command via the cloud-based service to update the agent. The update command includes one or more update parameters, such as new bits to reinstall the first service, i.e., the agent. The agent executes the update command and generates an updated first service, i.e., an updated agent for the VM based on the one or more update parameters. In some other embodiments, a maintenance mode at a robot level may be implemented. The maintenance mode for the robot includes operations associated with provisioning and/or fixing issues with the robot. This eliminates rebooting of the VM, which may improve operation of the robot in the VM.

Some embodiments incorporate the use of computationally efficient technologies, such as RPA, to provide high degree of computational efficiency by providing improved execution time and reduced storage requirements and at the same time, less complexity at user device level. This is because the "system" may be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the embodiments in any way but is intended to provide one example of the many embodiments. Indeed, some embodiments may be implemented in localized and distributed forms consistent with computing technology, including cloud computing systems. These and other architectural configurations are discussed in the following description, without limiting the scope of the embodiments of the present invention.

FIG. 1 is an architectural diagram illustrating an RPA system 100, according to an embodiment of the present invention. RPA system 100 includes a designer 110 that allows a developer (e.g., a technical user) or a user (e.g., a non-technical user) to design and implement a plurality of automations for automating manual operations of activities or workflows. In some example embodiments, workflows include sign-up workflows for developing and testing functionality of the web application. Designer 110 provides a solution for application integration, as well as automating third-party applications, administrative Information Technology (IT) tasks, and business IT processes. Designer 110 further facilitates development of an automation package, which is a graphical representation of a business process. Simply put, designer 110 facilitates the development and deployment of the plurality of automations.

The automation project enables automation of rule-based processes by giving the developer control of the execution order and the relationship between a custom set of steps developed in a workflow, defined herein as "activities" for the web application testing. One commercial example of an embodiment of designer 110 is UiPath Studio Pro™. Each activity includes an action, such as clicking a button, reading a file, writing to a log panel, typing into a text box, hovering over a GUI element, etc. In some embodiments, workflows can be nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which can be triggered by a condition (i.e., transition) or an activity. Global exception handlers are particularly suitable for determining workflow behavior when encountering an execution error and for debugging processes.

Once a workflow is developed in designer 110, execution of business processes is orchestrated by a conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 acts as an integration point with third-party solutions and applications. In an embodiment, conductor 120 is integrated with a web-based user interface.

Conductor 120 manages a fleet of robots 130, connecting and executing robots 130 from a centralized point. Types of robots 130 that are managed include, but are not limited to, attended robots 132, unattended robots 134, development robots (similar to the unattended robots 134, but used for development and testing purposes), and nonproduction robots (similar to the attended robots 132, but used for development and testing purposes). The attended robots 132 are triggered by user events and operate alongside a human on the same computing system. The attended robots 132 are used with conductor 120 for a centralized process deployment and logging medium. Attended robots 132 help a human user accomplish various tasks and are triggered by the user events. In some embodiments, processes are not started from conductor 120 on this type of robot and/or they do not run under a locked screen. In certain embodiments, the attended robots 132 are started from a robot tray or from a command prompt. The attended robots 132 run under human supervision in some embodiments.

The unattended robots 134 run unattended in virtual environments and automate many processes. The unattended robots 134 are responsible for remote execution, monitoring, scheduling, and providing support for work queues. Debugging for all robot types is run in designer 110 in some embodiments. Both the attended robots 132 and unattended robots 134 automate various systems and applications including, but not limited to, mainframes, web applications, Virtual machines (VMs), enterprise applications (e.g., those produced by SAP®, SalesForce®, Oracle®, etc.), and computing system applications (e.g., desktop and laptop applications, mobile device applications, wearable computer applications, etc.).

Conductor 120 has various capabilities including, but not limited to, provisioning, deployment, configuration, queueing, monitoring, logging, and/or providing interconnectivity. Provisioning includes creating and maintenance of connections between robots 130 and conductor 120 (e.g., a web application). Deployment includes assuring the correct delivery of package versions to the assigned robots 130 for execution. Configuration includes maintenance and delivery of robot environments and process configurations. Queueing includes providing management of queues and queue items. Monitoring includes keeping track of robot identification data and maintaining user permissions. Logging includes storing and indexing logs to a database (e.g., an SQL database) and/or another storage mechanism (e.g., ElasticSearch®, which provides an ability to store and quickly query large datasets). Conductor 120 provides interconnectivity by acting as the centralized point of communication for the third-party solutions and/or applications.

Robots 130 can be execution agents that run workflows built in designer 110. One commercial example of some embodiments of the robot(s) 130 is UiPath Robots™. In some embodiments, robots 130 install the Microsoft Windows® Service Control Manager (SCM)-managed service by default. As a result, robots 130 can open interactive Windows® sessions under the local system account and have rights of a Windows® service.

In some embodiments, robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of robots 130 can be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. The user mode robot services can be trusted with and manage the credentials for robots 130. A Windows® application is automatically launched if the SCM-managed robot service is not installed.

Executors run given jobs under a Windows® session (i.e., they may execute workflows). The executors are aware of per-monitor dots per inch (DPI) settings. Agents could be Windows® Presentation Foundation (WPF) applications that display the available jobs in the system tray window. The agents could be a client of the service. The agents request to start or stop jobs and change settings. The command line is a client of the service. The command line is a console application that requests to start jobs and waits for their output.

Having components of robots 130 split as explained above helps developers, support users, and computing systems more easily run, identify, and track what each component is executing. Special behaviors can be configured per component this way, such as setting up different firewall rules for the executor and the service. The executor is always aware of the DPI settings per monitor in some embodiments. As a result, the workflows can be executed at any DPI, regardless of the configuration of the computing system on which they were created. Projects from designer 110 can also be independent of a browser zoom level in some embodiments. For applications that are DPI-unaware or intentionally marked as unaware, DPI is disabled in some embodiments.

Figure 2:
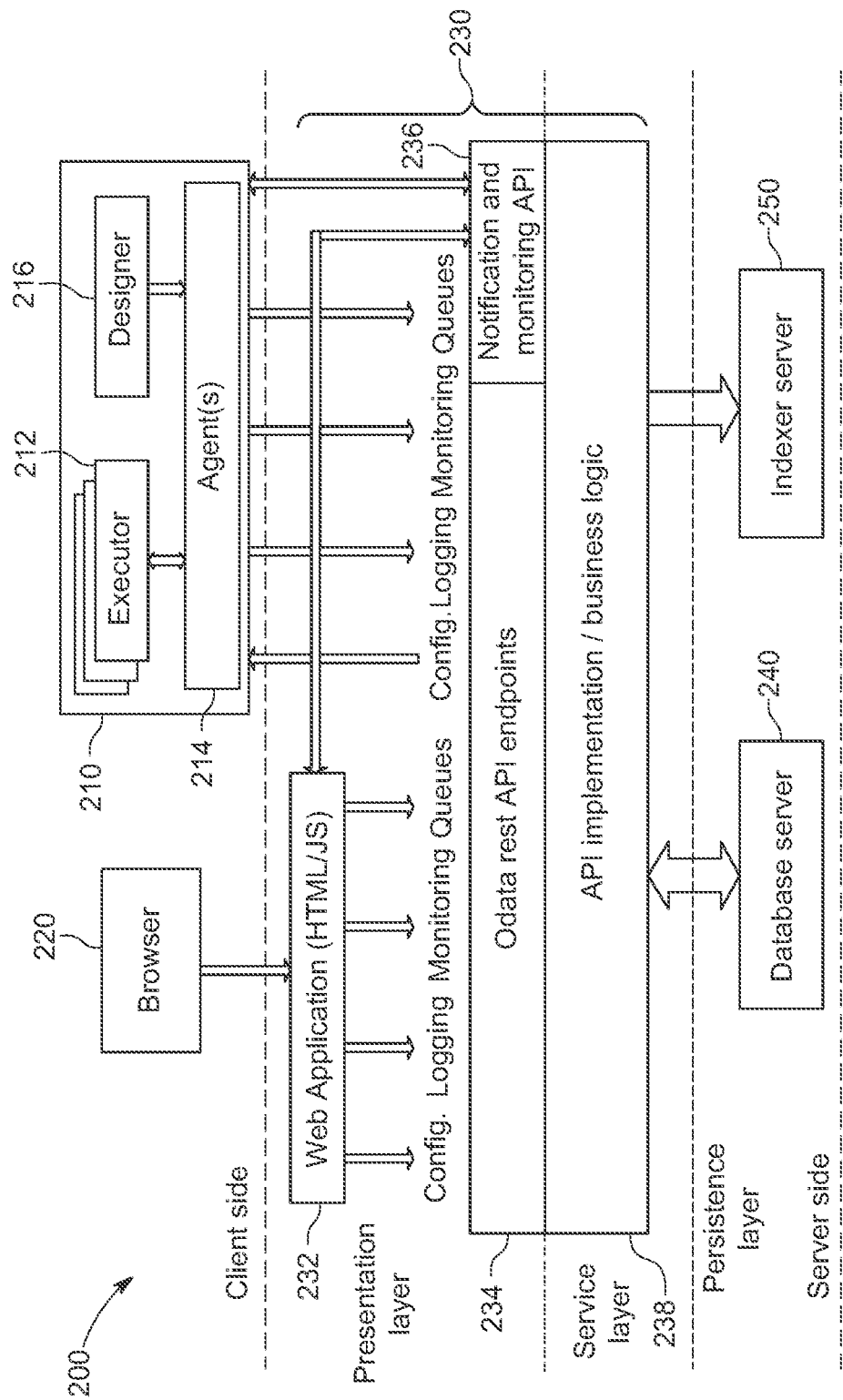
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may not be a part of, RPA system 100 of FIG. 1. It should be noted that a client side, a server side, or both, may include any desired number of the computing systems without deviating from the scope of the invention. On the client side, a robot application 210 includes executors 212, an agent 214, and a designer 216 (for instance, the designer 110). However, in some embodiments, designer 216 is not running on robot application 210. Executors 212 are running processes. Several business projects (i.e. executors 212) run simultaneously, as shown in FIG. 2. Agent 214 (e.g., the Windows® service) is the single point of contact for all executors 212 in this embodiment. All messages in this embodiment are logged into a conductor 230, which processes them further via a database server 240, an indexer server 250, or both. As discussed above with respect to FIG. 1, executors 212 are robot components.

In some embodiments, a robot represents an association between a machine name and a username. The robot manages multiple executors at the same time. On computing systems that support multiple interactive sessions running simultaneously (e.g., Windows® Server 2012), there multiple robots are running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 opens a WebSocket channel that is later used by conductor 230 to send commands to the robot (e.g., start, stop, etc.).

On the server side, a presentation layer (a web application 232, an Open Data Protocol (OData) Representative State Transfer (REST) Application Programming Interface (API) endpoints 234, and a notification and monitoring API 236), a service layer (an API implementation/business logic 238), and a persistence layer (the database server 240 and the indexer server 250) are included. Conductor 230 may include web application 232, the OData REST API endpoints 234, the notification and monitoring API 236, and the API implementation/business logic 238. In some embodiments, most actions that a user performs in an interface of conductor 230 (e.g., via a browser 220) are performed by calling various APIs. Such actions include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user creates robot groups, assign packages to the robots, analyze logs per robot and/or per process, start and stop robots, etc.

In addition to web application 232, conductor 230 also includes service layer that exposes the OData REST API endpoints 234. However, other endpoints may be included without deviating from the scope of the invention. The REST API is consumed by both web application 232 and agent 214. The agent 214 is the supervisor of the one or more robots on the client computer in this embodiment.

The REST API in this embodiment covers configuration, logging, monitoring, and queueing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queueing REST endpoints are responsible for queues and queue item management, such as adding data to a queue, obtaining a transaction from the queue, setting the status of a transaction, etc.

Monitoring REST endpoints monitor web application 232 and agent 214. The notification and monitoring API 236 could be REST endpoints that are used for registering agent 214, delivering configuration settings to agent 214, and for sending/receiving notifications from the server and agent 214. The notification and monitoring API 236 also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 manages queues and queue items. In some embodiments, database server 240 stores messages logged by the robots (in addition to or in lieu of indexer server 250).

Indexer server 250, which is optional in some embodiments, stores and indexes the information logged by the robots. In certain embodiments, indexer server 250 could be disabled through the configuration settings. In some embodiments, indexer server 250 uses ElasticSearch®, which is an open-source project full-text search engine. The messages logged by robots (e.g., using activities like log message or write line) are sent through the logging REST endpoint(s) to indexer server 250, where they are indexed for future utilization.

Figure 3:
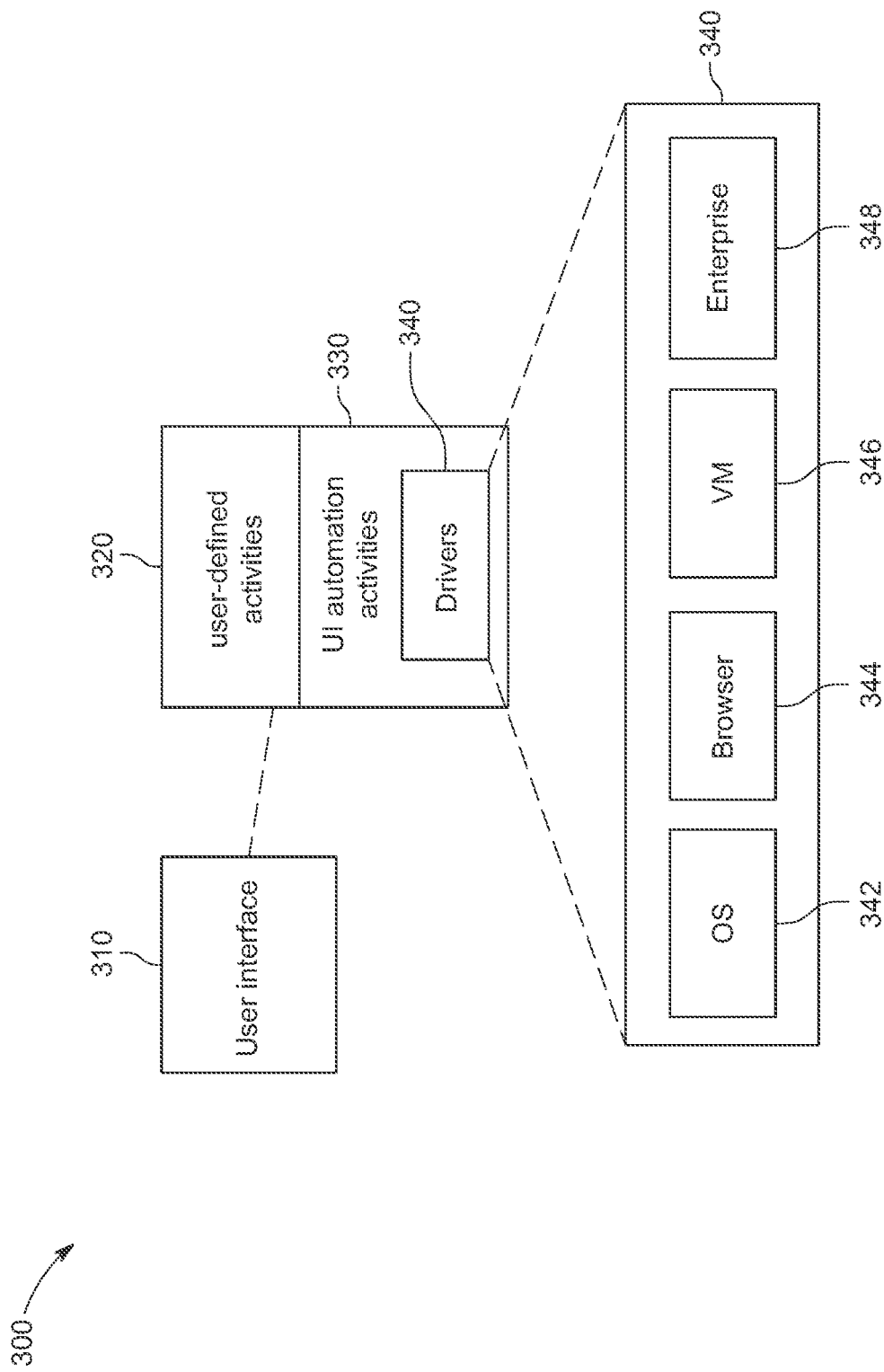
FIG. 3 is an architectural diagram illustrating the relationship between a designer, activities, and drivers, according to an embodiment of the present invention.

FIG. 3 is an architectural diagram illustrating a relationship 300 between a user interface 310, user-defined activities 320, User Interface (UI) automation activities 330, and drivers 340, according to an embodiment of the present invention. Per the above, user interface 310 comprises an interface between an end user and an RPA application. When the end user is developer or a tester, trying to generate or create RPA applications or workflows for any application using a robot, user interface 310 may include an application design module or environment, such as UIPath Designer™. The RPA application or workflow may be related to automation of UI access operations, as defined by various types of UI automation activities 330. UI automation activities 330 may be configurable by the user, such as by including an application interface for controlling an RPA robot deployed in a virtual machine provisioned by a second service, for example, a robot control service, a container service, or the like.

In some embodiments, the workflows include user-defined activities 320 and UI automation activities 330. Some embodiments are able to identify non-textual visual components in an image associated with the workflows, such as the label data, which is an image of the artwork label, using computer vision (CV) activities. Some CV activities pertaining to such components may include, but are not limited to, extracting of text from segmented label data using optical character recognition (OCR), fuzzy text matching, cropping of segmented label data using machine learning, comparison of extracted text in label data with ground truth data and the like. In some embodiments, there may be hundreds or even thousands of activities that may be implemented in user defined activities 320 component. However, any number and/or type of activities may be available without deviating from the scope of the invention.

UI automation activities 330 are a subset of special, lower-level activities that are written in lower-level code (e.g., CV activities) and facilitate interactions with the screen. In some embodiments, UI automation activities 330 include the type activity, the click activity, or the hover activity as discussed above. UI automation activities 330 facilitate these activities via drivers 340 that allow the robot to interact with the desired software. For instance, drivers 340 include Operating System (OS) drivers 342, browser drivers 344, VM drivers 346, enterprise application drivers 348, etc.

Drivers 340 are configured to interact with OS drivers 342 at a low level looking for hooks, monitoring for keys, etc. They may facilitate integration with Chrome®, IE®, Citrix®, SAP®, etc. For instance, the "click" activity performs the same role in these different applications via drivers 340. Drivers 340 may enable execution of an RPA application in an RPA system. Browser drivers 344 include a web-based user interface for a user or developer to interact.

Figure 4:
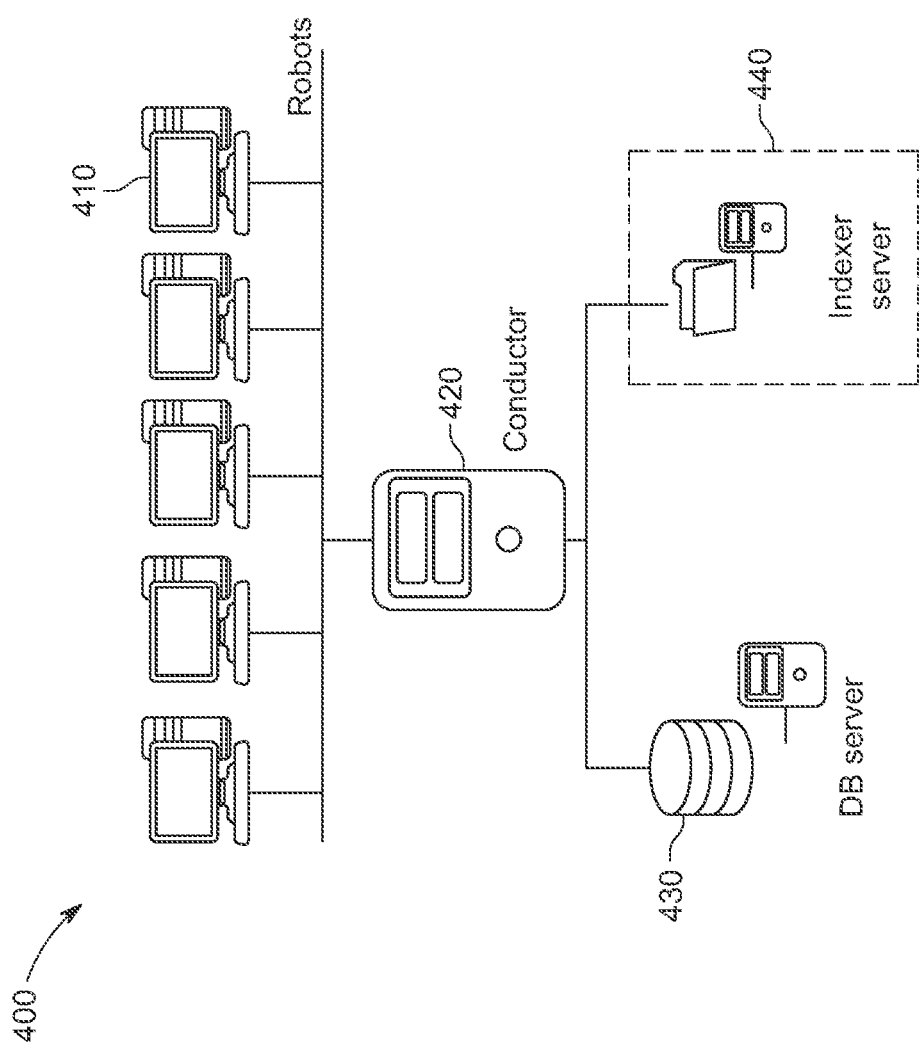
FIG. 4 is an architectural diagram illustrating another RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 (for instance, running robots). In some embodiments, multiple client computing systems 410 are configured to compare the multiple RPA packages and RPA workflows. Multiple client computing systems 410 are further configured to communicate with a conductor computing system 420 via a web application running thereon. Conductor computing system 420, in turn, is configured to communicate with a database server 430 (for instance, the database server 240) and an optional indexer server 440 (for instance, the optional indexer server 250).

With respect to the FIGS. 1 and 3, it should be noted that while the web application is used in these embodiments, any suitable client/server software may be used without deviating from the scope of the invention. For instance, the conductor may run a server-side application that communicates with non-web-based client software applications on the client computing systems. The server may be implemented in localized and distributed forms consistent with computing technology, including cloud computing systems.

Figure 5:
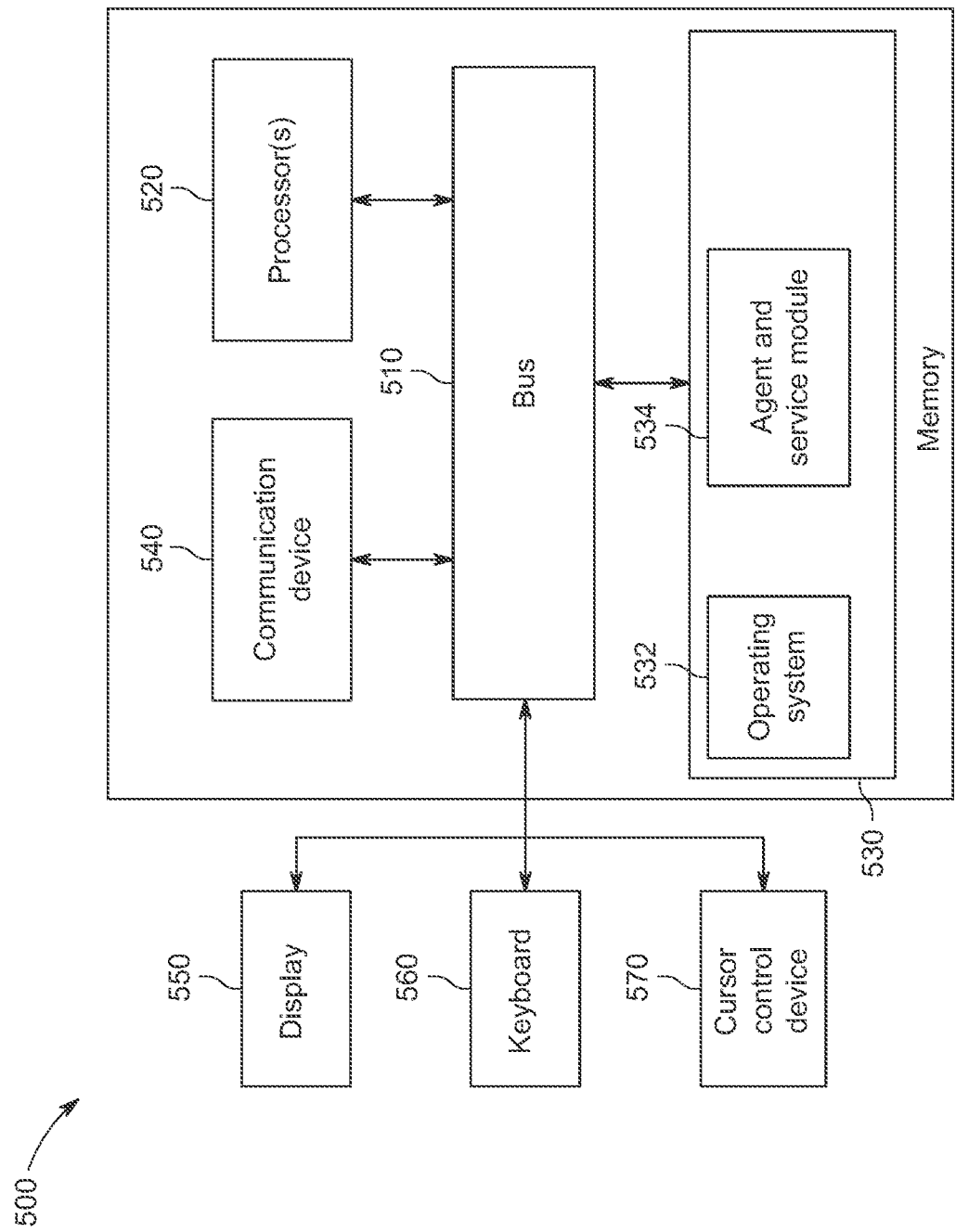
FIG. 5 is an architectural diagram illustrating a computing system configured for controlling a robot of a virtual machine, according to an embodiment of the present invention.

FIG. 5 is an architectural diagram illustrating a computing system 500 configured for performing a test of an application using an automation bot, according to an embodiment of the present invention. In some embodiments, computing system 500 may be one or more of the computing systems depicted and/or described herein. Computing system 500 includes a bus 510 or other communication mechanism for communicating information, and processor(s) 520 coupled to bus 510 for processing information. Processor(s) 520 could be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 520 may also have multiple processing cores, and at least some of the cores may be configured to perform specific functions. Multi-parallel processing is used in some embodiments. In certain embodiments, at least one of the processor(s) 520 can be a neuromorphic circuit that includes processing elements that mimic biological neurons. In some embodiments, neuromorphic circuits do not require the typical components of a Von Neumann computing architecture.

Computing system 500 further includes a memory 530 for storing information and instructions to be executed by the processor(s) 520. Memory 530 may be comprised of any combination of Random-Access Memory (RAM), Read Only Memory (ROM), flash memory, cache, static storage such as a magnetic or optical disk, or any other types of non-transitory computer-readable media or combinations thereof. The non-transitory computer-readable media may be any available media that may be accessed by processor(s) 520 and may include volatile media, non-volatile media, or both. The media may also be removable, non-removable, or both.

Additionally, computing system 500 includes a communication device 540, such as a transceiver, to provide access to a communications network via a wireless and/or wired connection. In some embodiments, communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, the communication device 540 includes one or more antennas that are singular, arrayed, phased, switched, beamforming, beam steering, a combination thereof, and or any other antenna configuration without deviating from the scope of the invention.

Processor(s) 520 are further coupled via bus 510 to a display 550, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high-definition display, a Retina® display, an In-Plane Switching (IPS) display, or any other suitable display for displaying information to a user. The display 550 is configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 560 and a cursor control device 570, such as a computer mouse, a touchpad, etc., are further coupled to bus 510 to enable a user to interface with computing system. However, in certain embodiments, a physical keyboard and mouse are not present, and the user interacts with the device solely through display 550 and/or a touchpad (not shown). Any type and combination of input devices may be used as a matter of design choice. In certain embodiments, no physical input device and/or display is present. For instance, the user interacts with computing system 500 remotely via another computing system in communication therewith, or computing system 500 may operate autonomously.

Memory 530 stores software modules that provide functionality when executed by processor(s) 520. The modules include an operating system 532 for computing system 500. The modules further include an agent and service module 534 configured to perform all, or part of the processes described herein or derivatives thereof for provisioning controlling of an automation bot deployed in a virtual machine.

One skilled in the art will appreciate that a "system", such as the computing system 500, could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to emphasize their implementation independence more particularly. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

In some embodiments, computing system 500 performs controlling of a robot deployed in a virtual machine using a service running in computing system 500. The service may be in the form of a software component, such as an agent. For example, if the computing system runs on Microsoft™, Windows™ operating system, then the service may be a Windows™ based service. Computing system 500 is integrated or associated to an architecture that includes a first service, such as an agent with the virtual machine and a second service, a robot control service, a container service, or the like. The exemplary architecture integrated with computing system 500 for controlling the robot using the first service (or agent) is described next with reference to FIG. 6.

Figure 6:
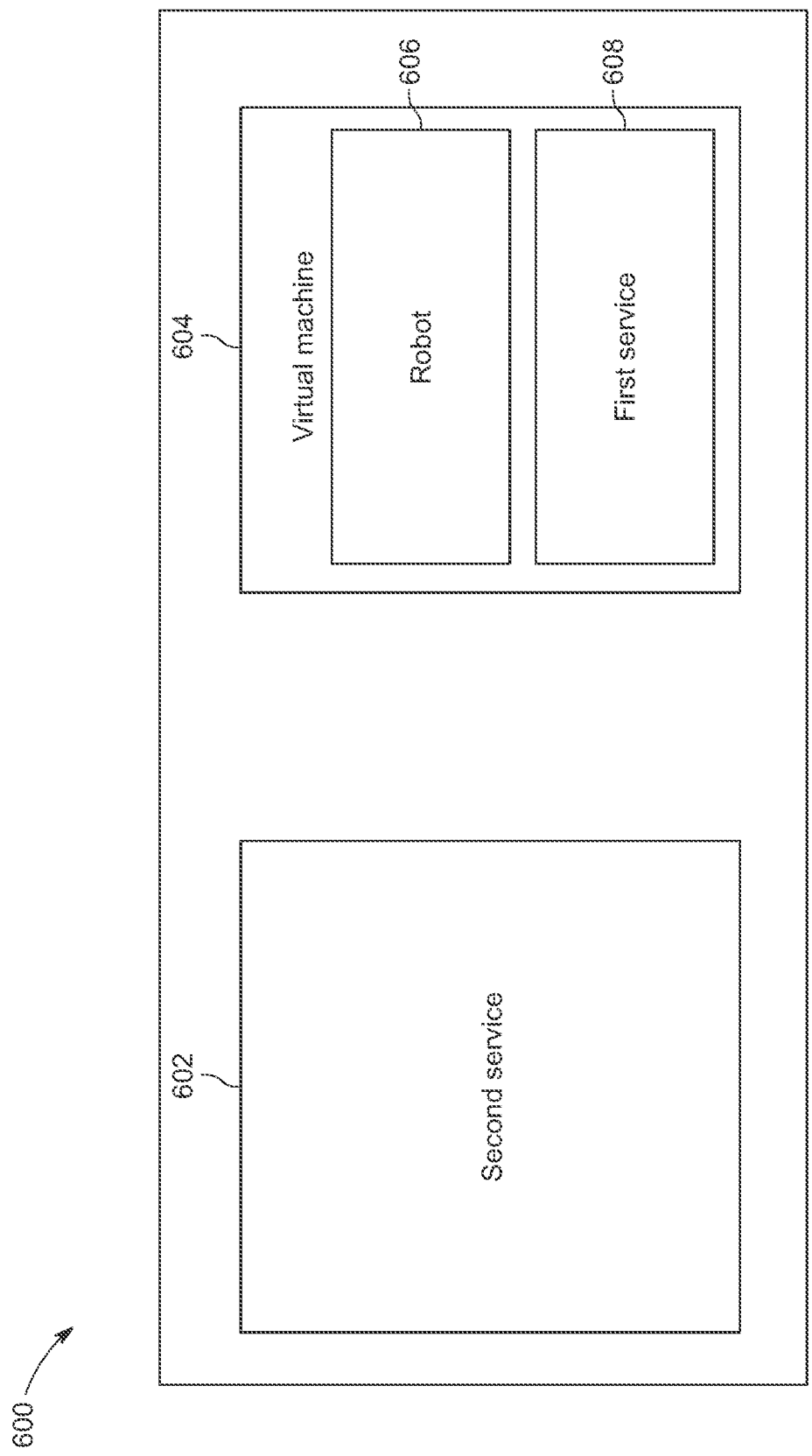
FIG. 6 is an architecture for controlling a robot of a virtual machine, according to an embodiment of the present invention.

FIG. 6 is an architecture 600 for controlling robot 606 of a virtual machine (VM) 604, according to an embodiment of the present invention. In some example embodiments, robot 606 is deployed in virtual machine 604, which is installed with a first service 608. In some embodiments, first service 608 is installed as a software program agent that starts operating with virtual machine 604. For example, first service 608 is installed as a native service of computing system 500, such as a Windows™ service, that runs as background operation of virtual machine 604.

Also, in some embodiments, virtual machine 604 is authenticated based on a token. The token includes a robot license key corresponding to robot 606 and a secret key. In some embodiments, the token is generated in a second service 602 that provisions controlling robot 606 in virtual machine 604 using first service 608. The generated token is stored in a database (not shown in FIG. 6) of second service 602. Further, virtual machine 604 receives the token from second service 602 at time of deploying first service 608 in virtual machine 604. For instance, the token is copied to a file under a directory that installs first service 608 in virtual machine 604. The token is accessible to first service 608 and computing system 500 and protected from being accessed by public users or any unidentified users.

After the installation of first service 608 in virtual machine 604, a connection between first service 608 and second service 602 is established enabling second service 602 to install or control a robot, e.g., robot 606 in virtual machine 604. In some embodiments, second service 602 corresponds to a robot control service that sends commands, such as installation command of robot 606, a connection command to connect with robot 606 using first service 608. In some other embodiments, second service 602 includes a container service for provisioning controlling robot 606. More specifically, the container service includes a service or a set of services to be executed for controlling robot 606 using first service 608. The service or the set of services may correspond to installation of robot 606, connecting with robot 606 using first service 608, or the like.

The control of robot 606 by second service 602 using first service 608 is further described next in FIG. 7.

Figure 7:
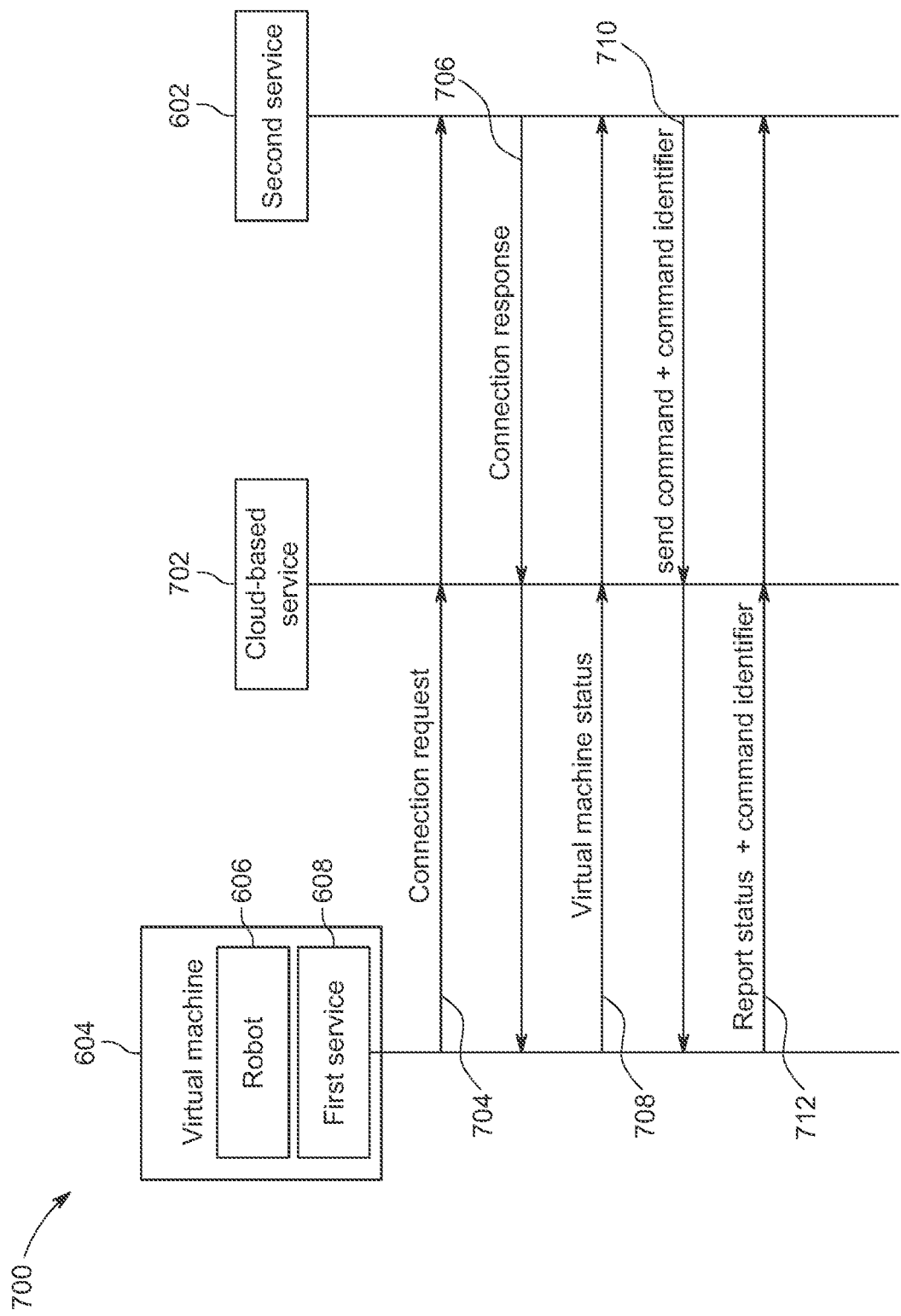
FIG. 7 shows a communication flow diagram of a method for controlling a robot of a virtual machine, according to an embodiment of the present invention.

FIG. 7 shows a communication flow diagram 700 for controlling robot 606 of virtual machine 604, according to an embodiment of the present invention. In some embodiments, first service 608 connects to second service 602 via a cloud-based service 702.

At step 704, first service 608 transmits a connection request to second service 602 via cloud-based service 702. In some embodiments, the token generated for the authentication of virtual machine 604 is added in a header of the connection request. The token is verified by cloud-based service 702 using an authorization handler. The token is used to authenticate virtual machine 604 and is the authentication is successful, the At step 706, second service 602 generates a connection response upon receipt of the connection request. A connection is established between second service 602 and first service 608 in response to the connection response of second service 602. In some embodiments, computing system 500 generates a connection identifier for second service 602 upon establishing the connection between second service 602 and first service 608.

At step 708, first service 608 sends status information of virtual machine 604 via cloud-based service 702. The status information includes an active state of virtual machine 604, a machine key of virtual machine 604, a host machine name of virtual machine 604, a set of authentication credential data of virtual machine 604, a plurality of telemetry data of virtual machine 604, or the like. The status information may be sent periodically from first service 608 to second service 602, e.g., after every elapse of a pre-defined time-interval. For example, if the pre-defined time interval is 20 seconds, then after every 20 seconds, status of virtual machine 604 is sent from first service 608 to second service 602 via cloud-based service 702.

At step 710, second service 602 sends a command along with a corresponding command identifier upon receipt of the status information. In some embodiments, second service 602 requests a function of computing system 500 to generate the command identifier. The command is sent along with the command identifier to first service 608 using the connection identifier.

At step 712, first service 608 sends a notification and a report along with the command identifier to second service 602. The report corresponds to state of command being executed, which is described next in FIG. 8.

Figure 8:
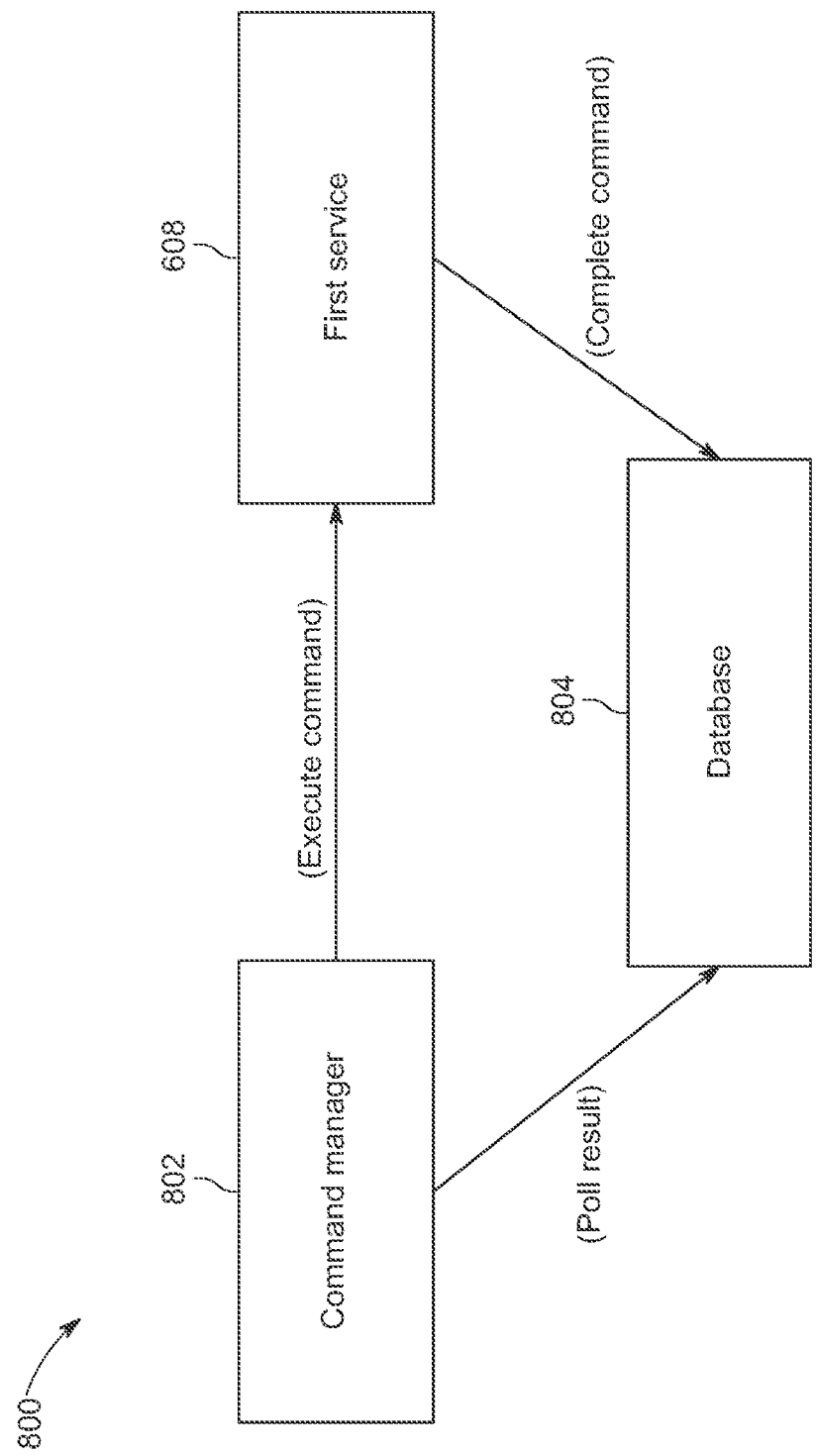
FIG. 8 shows a state diagram illustrating execution of a command for controlling a robot of a virtual machine, according to another embodiment of the present invention.

FIG. 8 shows a diagram 800 illustrating execution of a command for controlling robot 606 of virtual machine 604, according to another embodiment of the present invention. The command from second service 602 is queued and managed by command manager 802. In some embodiments, second service 602 calls a function to generate a command identifier for the command and pushes a notification to first service 608 to execute the command. The command is executed by first service 608. A state of the command to control robot 606 is saved in a database 804. The state of the command being executed to control robot 606 is indicative of one of a completion state, incompletion state, and/or execution state of the command.

Further, command manager 802 polls database 804 for completion of the command. Upon completion of the command, the completion state of the command is returned. In case, the command is not completed within a predefined time-period, a timeout error is returned to second service 602. At this time, first service 608 disconnects from second service 602 and reconnects again via cloud-based service 702.

In some embodiments, second service 602 sends an update command via service 702 to update first service 608. The update command includes one or more update parameters. For instance, the one or more update parameters include new bits to reinstall first service 608. First service 608 executes the update command and generates an updated agent for virtual machine 604 based on the one or more update parameters. The update of an agent, such as first service 608, eliminates rebooting of virtual machine 604, which improves operation of robot 606. In some cases, a maintenance mode at a robot level may be implemented to avoid rebooting of virtual machine 604.

Figure 9:
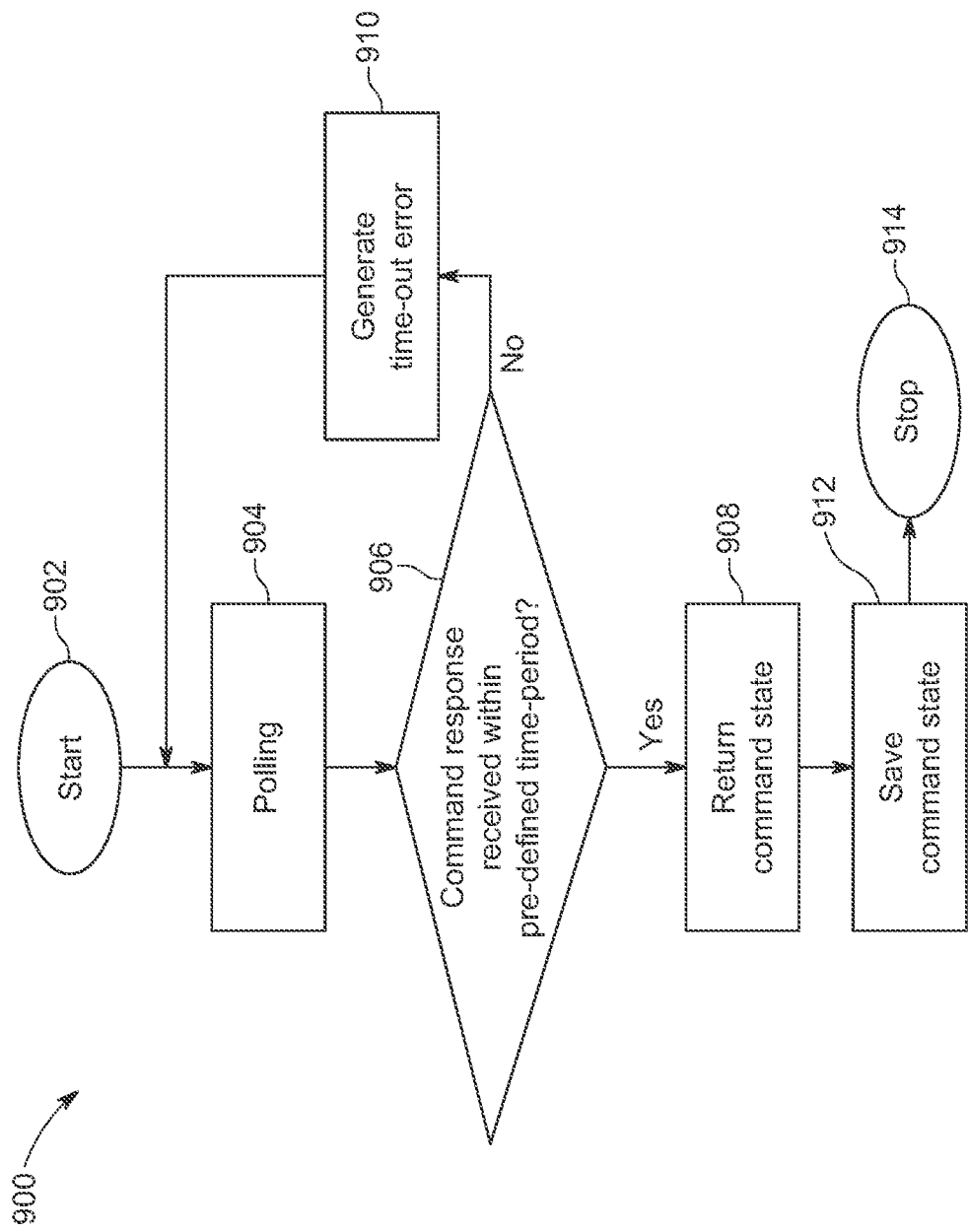
FIG. 9 is a flow diagram illustrating a method for polling for a command for controlling a robot of a virtual machine, according to an embodiment of the present invention.

FIG. 9 is a flow diagram illustrating a method 900 for polling a command for controlling a robot of a virtual machine, according to an embodiment of the present invention. Method 900 is executed for the command to be executed by first service 608. Examples of the command include an install command to install robot 606 in VM 604, a connect command to connect robot 606 to an orchestrator, such as conductor 120, a disconnect command to disconnect robot 606 from the orchestrator, or the like. Method 900 starts at step 902 after second service 602 sends the command to first service 608.

At step 904, command manager 802 begins polling for a command response of the command to be executed by first service 608. At step 906, command manager 802 checks if a command response of the command is received within a pre-defined time-period, such as 20 seconds. In some example embodiments, the command response is transmitted by first service 608 via a notification and a report, such as a status report upon completion of the command execution. The status report includes state of the command, such as complete state, incomplete state, and/or execution state of the command.

If the command response is received within the pre-defined time-period, then at step 908, a command state corresponding to the command is returned. In particular, command manager 802 receives the command state, such as complete state, incomplete state, and/or execution state of the command.

If the command response is not received within the pre-defined time-period, then at step 910, a time-out error is generated. After the generation of the time-out error, process loops back to polling step 904.

At step 912, the command state is saved in database 804. Process 900 ends at step 914.

Figure 10:
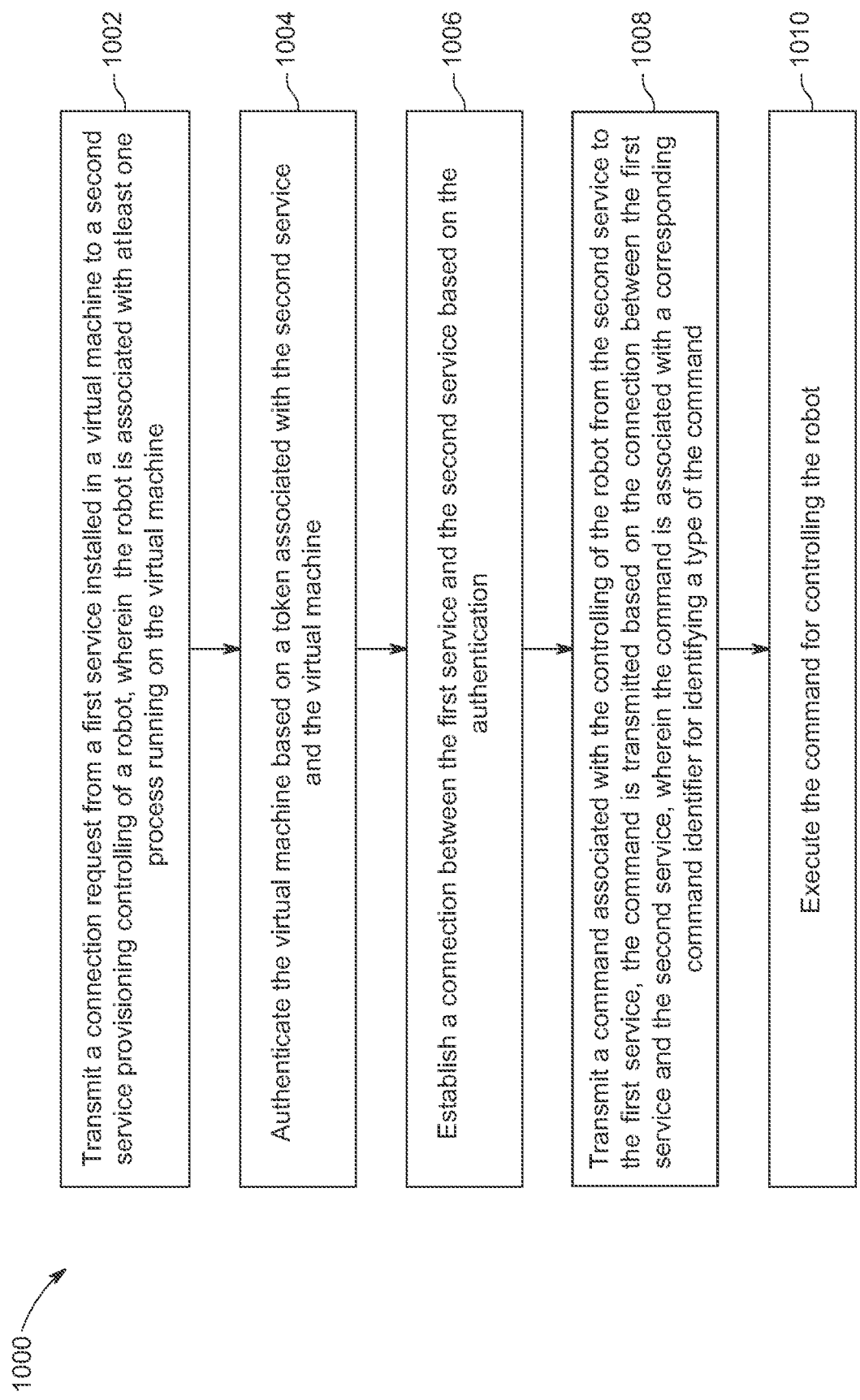
FIG. 10 is a flowchart illustrating a method flow for controlling a robot of a virtual machine, according to an embodiment of the present invention.

FIG. 10 is a flowchart illustrating a method flow 1000 for controlling a robot (e.g., robot 606) of a virtual machine (e.g., virtual machine 604), according to an embodiment of the present invention. At step 1002, method 1000 includes transmit a connection request from a first service (e.g., first service 608) installed in a virtual machine to a second service (e.g., second service 602) provisioning the controlling of the robot. The robot is associated with at least one process running on the virtual machine. In some embodiment, the first service corresponds to an agent that is installed as a software program in the virtual machine. When the agent is deployed in the virtual machine, the virtual machine receives a token that is generated in the second service. The token includes a robot license key corresponding to the robot and a secret key (refer FIG. 6).

At step 1004, method 1000 includes authenticate the virtual machine based on a token associated with the second service and the virtual machine. In some embodiments, the second service may be a cloud-based service or another native service or any remote server-based service or a container service that can enable provisioning of virtual machine environment. In some other embodiments, the second service includes a container service for provisioning the control of the robot that is associated with at least one process running on the virtual machine.

At step 1006, method 1000 includes establishing a connection between the first service and the second service based on the authentication. The establishment of the connection between the agent and the second service, is described in step 704 and step 706 of FIG. 7. In some embodiments, a status information associated with the virtual machine is transmitted periodically from the first service to the second service after an elapse of a pre-defined time-interval. The periodic transmission is done upon establishment of the connection between the first service and the second service. The status information includes an active status of the virtual machine, a key associated with the virtual machine a host machine name associated with the virtual machine, a set of authentication credential data and a plurality of telemetry data of the virtual machine.

At step 1008, method 1000 includes transmitting a command associated with the controlling of the robot from the second service to the first service based on the connection of the virtual machine. The command is associated with a corresponding command identifier for identifying a type of the command. The command corresponds to at least an installation command to install the robot, a connect command to connect the robot to an orchestrator, and a disconnect command to disconnect the robot from the orchestrator. The command identifier is transmitted along with a notification and a report from the first service to the second service upon execution of the command. The report corresponds to a state of the command.

At step 1010, method 1000 includes executing the command for controlling the robot.

In an embodiment, method 1000 of FIG. 10 includes configuring a computer program associated with a hardware processor configured to execute a series of operations, wherein the series of operations are used to perform all or some of the steps described in conjunction with the method 1000. The hardware processor may, for example, be configured to execute the series of operations associated with method 1000 by performing hardware implemented logical functions, executing stored instructions, or executing algorithms for performing each of the operations. Alternatively, the apparatus includes a means for performing each of the operations described above. In this regard, according to an embodiment, examples means for executing the series of operations associated with method 1000 include processor 520, which is implemented in system 500 and/or a device or circuit for executing instructions or executing an algorithm for processing information as described above.

The computer program may be implemented in hardware, software, or a hybrid implementation. The computer program may be composed of modules that are in operative communication with one another, and which are designed to pass information or instructions to display. The computer program may be configured to operate on a general-purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. A system for controlling a robot, comprising:
a memory configured to store one or more computer-executable instructions; and
at least one processor configured to execute the one or more computer-executable instructions to:

transmit a connection request from a first service installed in a virtual machine to a second service, wherein the robot is associated with at least one process running on the virtual machine;
authenticate the virtual machine based on a token associated with the second service and the virtual machine;
establish a connection between the first service and the second service based on the authentication;
transmit a command associated with the controlling of the robot from the second service to the first service, the command is transmitted based on the connection between the first service and the second service, wherein the command is associated with a corresponding command identifier for identifying a type of the command; and
execute the command for controlling the robot.

2. The system of claim 1, wherein the at least one processor is further configured to execute the one or more computer-executable instructions to:
transmit a notification and a report along with the command identifier, the notification being transmitted from the first service to the second service upon execution of the command, wherein the report corresponds to a state of the command.

3. The system of claim 1, wherein the at least one processor is further configured to execute the one or more computer-executable instructions to:
transmit periodically a status information associated with the virtual machine, the periodic transmission is from the first service to the second service after elapse of a pre-defined time-interval, wherein the periodic transmission is done upon establishment of the connection between the first service and the second service.

4. The system of claim 3, wherein the status information comprises:
an active status of the virtual machine, a key associated with the virtual machine, a host machine name associated with the virtual machine, a set of authentication credential data and a plurality of telemetry data of the virtual machine.

5. The system of claim 1, wherein the second service comprises a container service executing a service or a set of services for provisioning the control of the robot.

6. The system of claim 1, wherein to authenticate the virtual machine based on the token, the at least one processor is further configured to:
generate the token in the second service; and
store the token in a database of the second service.

7. The system of claim 6, wherein the token comprises:
a robot license key; and
a secret key.

8. The system of claim 7, wherein the at least one processor is further configured to carry out the instructions to copy the token to a location in the virtual machine where the first service is installed.

9. The system of claim 7, wherein for the establishment of the connection between the first service and the second service, the at least one processor is further configured to:
generate a connection identifier for the second service;
transmit the connection request along with the connection identifier from the first service to the second service, wherein the connection request comprises the token;
transmit a connection response corresponding to the connection request from the second service; and
establish the connection between the first service and the second service based on the connection response.

10. The system of claim 9, wherein the at least one processor is further configured to perform a mapping of the connection identifier to the command identifier.

11. The system of claim 10, wherein the at least one processor is further configured to transmit the command with the corresponding command identifier from the second service to the first service using the connection identifier.

12. The system of claim 1, wherein the at least one processor is further configured to:
poll for a completion of the command; and
generate a timeout error when the command is not completed within a predefined time-period.

13. The system of claim 1, wherein the command corresponds to at least an install command to install the robot in the virtual machine, a connect command to connect the robot to an orchestrator and a disconnect command to disconnect the robot from the orchestrator, and a maintenance command associated with a maintenance mode operation for the robot.

14. The system of claim 1, wherein the at least one processor is further configured to:
receive, an update command for the first service from the second service, wherein the update command comprises one or more update parameters;
update the first service using the one or more update parameters of the update command; and
generate an updated first service for the virtual machine based on the update.

15. A method for controlling of a robot, comprising:
transmitting a connection request from a first service installed in a virtual machine to a second service, wherein the robot is associated with at least one process running on the virtual machine;
authenticating the virtual machine based on a token associated with the second service and the virtual machine;
establishing a connection between the first service and the second service based on the authentication;
transmitting a command associated with the controlling of the robot from the second service to the service based on the connection between the first service and the second service, wherein the command is associated with a corresponding command identifier for identifying a type of the command; and
executing the command for controlling the robot.

16. The method of claim 15, further comprising:
transmitting a notification and a report along with the command identifier, from the first service to the second service upon execution of the command, wherein the report corresponds to a state of the command.

17. The method of claim 15, further comprising:
transmitting periodically, a status information associated with the virtual machine, from the service to the second service after elapse of a pre-defined time-interval, wherein the status information comprises an active status of the virtual machine, a key associated with the virtual machine a host machine name associated with the virtual machine, a set of authentication credential data and a plurality of telemetry data of the virtual machine and wherein the periodic transmission is done upon establishment of the connection between the first service and the second service.

18. The method of claim 15, wherein authenticating further comprises:
generating the token in the second service; and
storing the token in a database of the second service.

19. The method of claim 15, wherein establishing the connection between the service and the second service further comprises:
  generating a connection identifier for the second service;
  transmitting the connection request along with the connection identifier from the first service to the second service, wherein the connection request comprises the token;
  transmitting a connection response corresponding to the connection request from the second service; and
  establishing the connection between the first service and the second service based on the connection response.

20. A computer program stored on a non-transitory computer readable medium, the computer program, when executed by one or more processors, are configured to cause the one or more processors to perform operations for controlling of a robot, the operations comprising:
  transmitting a connection request between a first service installed in a virtual machine and a second service, wherein the robot is associated with at least one process running on the virtual machine;
  authenticating the virtual machine based on a token associated with the second service and the virtual machine;
  establishing a connection between the first service and the second service;
  transmitting a command associated with the controlling of the robot from the second service to the first service based on the connection between the first service and the second service, wherein the command is associated with a corresponding command identifier for identifying a type of the command; and
  executing the command for controlling the robot.

* * * * *